June 21, 1966
R. P. HOTCHKIN
3,257,098
LANDING GEAR FOR SEMI-TRAILERS
Filed Nov. 12, 1963
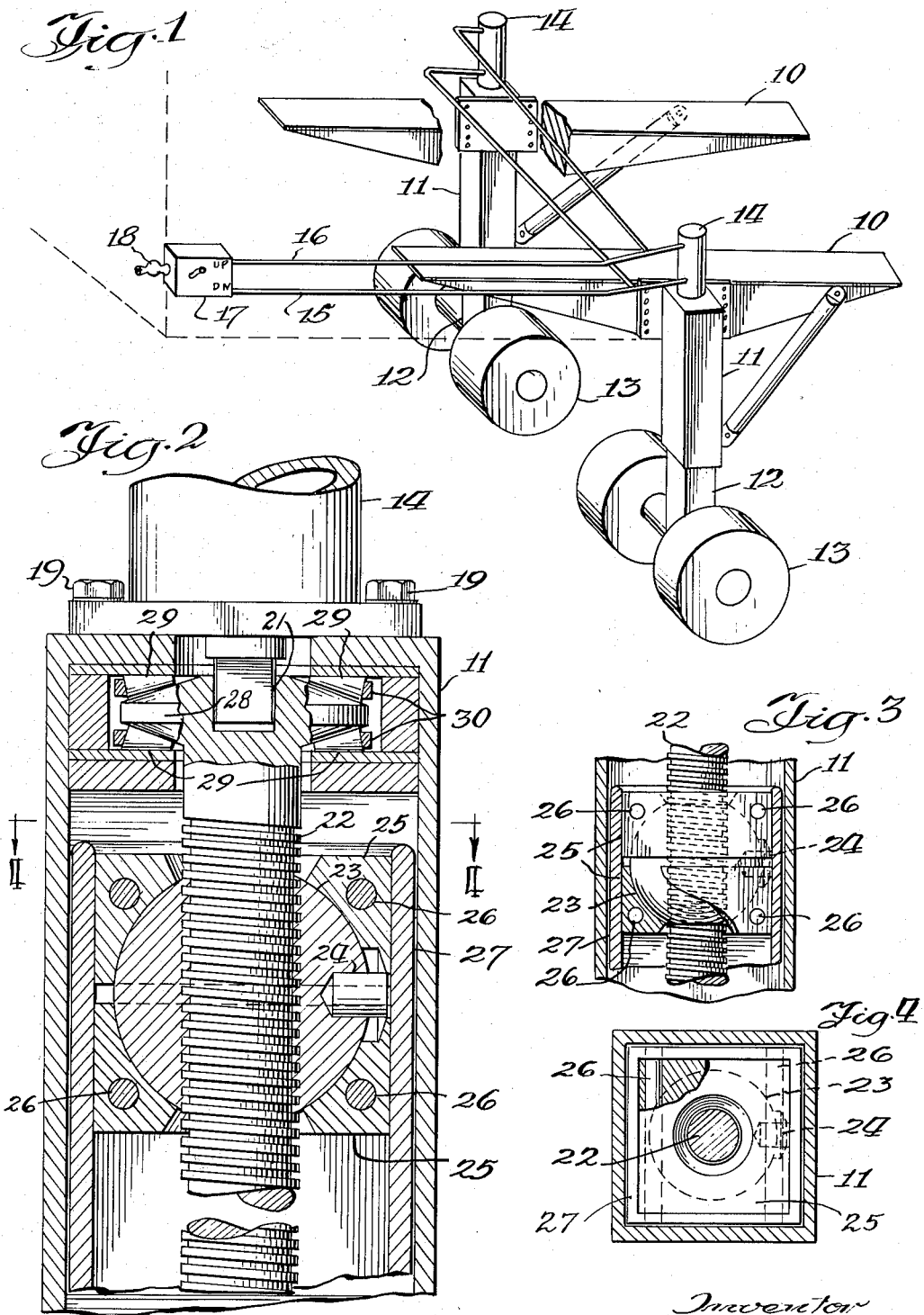

United States Patent Office 3,257,098
Patented June 21, 1966

3,257,098
LANDING GEAR FOR SEMI-TRAILERS
Roy P. Hotchkin, 68 Waverly, Clarendon Hills, Ill.
Filed Nov. 12, 1963, Ser. No. 322,992
4 Claims. (Cl. 254—86)

This invention relates to method and means for supporting a semi-trailer while detached from a truck tractor. More specifically, the invention relates to method and means for supporting a semi-trailer during and after detachment from a tractor so as to maintain the semi-trailer in essentially the same position it occupied while being supported at its forward end by a truck tractor.

Present and past practice in the trucking industry has been to support the semi-trailer when detached by means of landing gear consisting of two legs generally having wheels at their lower extremities, these two legs being either manually or power operated in unison.

Power operated legs in the prior art are of the fold-up type, the legs being of a fixed length folded up under the trailer when not in use and swung down and forward by power operated system. For several reasons this system and method did not receive acceptance and manually operated landing gear has remained as the industry standard.

Whether manual or of such power type, in being operated in unison it can be seen that the down or extended position of such a pair of wheels is limited by the wheel that first makes contact with the ground. Where the ground is level and evenly compacted or properly paved there is no special difficulty in parking and detaching a semi-trailer. However, where there is a sloping grade width-wise of the trailer at the location in which it is to be parked or where there is a lack of surface compaction or lack of evenness, the wheel to first make contact with the ground limits the extension of the landing gear legs to produce unequal loading between the two legs when the tractor is removed. This, of course, produces a tilting or leaning of the trailer which makes recoupling of the tractor to the trailer quite complicated and difficult. On such occasions and under those circumstances the driver may be seen forcefully ramming the rear trailer-supporting portion of the tractor under the front end of the trailer in attempting to couple them together. This can be difficult and even destructive, particularly when the trailer is loaded and the weight of trailer and load has to be forcefully lifted off of the trailer landing gear and onto the truck tractor.

It can further be seen that unequal loading of the two landing gear legs, with or without the effect of forceful efforts occasionally required to couple trailer to tractor, will tend to bend the landing gear legs and jam their operating mechanism. Such tendencies are presumably the reason for the trucking industry having very widely accepted a landing gear system comprising two legs operated in unison by a single hand operated crank. The system is quite simple; however, it is relatively slow and is reliable only so long as the legs are not bent. Operating the two legs in unison does, of course, subject them to unequal loading and does permit the trailer to lean or tilt under conditions described above. Moreover, because of the extra time and effort drivers often raise the legs only enough to clear the road. Often this is followed by severe damage to the landing gear legs when the tractor and trailer are later driven over a curb or other sudden rise in the roadway.

Accordingly, it is an object of this invention to provide a method and means for supporting the forward end of a semi-trailer which is rapid and reliable. A further object is to provide such method and means which will reduce or eliminate the need for forceful coupling of tractor to trailer.

Another object of this invention is to provide method and means for supporting the forward end of a semi-trailer which will minimize the adverse effect on landing gear operation due to bends that may have occurred in the leg members.

These and related objects are achieved by this invention wherein each of two legs supporting the trailer while detached from the tractor is separately or independently operated by a fluid pressure ssytem. In a modification of the invention certain objects are achieved in further degree by reason of the screw in each leg applying force to the telescoping lower portion through an omni-directional force-transmitting coupling. In another modification of the invention certain objects such as speed and ease of operation are accomplished in further degree by the use of operating controls placed within the cab of the truck tractor permitting the driver to begin the process of uncoupling without stepping out of the cab.

Further description of the invention can be had by reference to the drawings in which:

FIG. 1 is the arrangement of the landing gear of the invention mounted beneath the forward end of a semi-trailer as it would appear when viewed in perspective if not hidden by the semi-trailer body;

FIG. 2 is an elevational cross-section of each leg of the landing gear in a retracted or raised position, the ground contacting element or wheel not shown;

FIG. 3 is a partial-section of the upper end of the lower portion of each leg, this upper end being the working connection between the lower portion which telescopes into the upper portion when retracted or raised;

FIG. 4 is a top view of each leg with cut-away portion to show a pinning arrangement for connecting bearing blocks to the lower portion of the leg.

Referring to FIG. 1, frame members 10 are pictured in abbreviated form beneath the forward end of the floor of a conventional semi-trailer represented by broken lines. To frame members 10 are attached landing gear legs consisting compositely of fixed upper portions 11, telescoping lower portions 12 and ground-contacting members 13 shown in the form of wheels. At the upper end of each of the legs are fluid-actuated motors within housing 14 connected by lines 15 and 16 to valve 17, an alternating valve, to which fitting 18 is connected. Although a hydraulic drive of various sorts in accordance with the arrangement shown should be suitable, the preferred form of the invention comprises the use of air-actuated reversible motors which exhaust to atmosphere. In principle such motors have an input shaft which is actuated by an impeller rotating under the action of impinging air under pressure. Through gear reduction the necessary decrease in speed and increase in power is obtained in the output shaft. Air passing the impeller enters and is exhausted to the atmosphere through one of a pair of air inlets and outlets each of which serves one impeller, the second impeller moving in a direction opposite to that of the other to provide a reverse drive. An illustration of such a motor is model 8206 Heavy-Duty Power Motor made by The Aro Corporation of Bryan, Ohio. This motor delivers 1.3 horsepower at a speed of 275 r.p.m. and has a stall torque of 86.50 foot pounds.

In operation, fitting 18 is coupled to a hose or similar line which, in turn, is connected to the conventional air brake system comprising compressor and air tank located on the tractor. If the hose from the air tank is the one used to conduct air under pressure to the trailer's rear wheel brakes the operator, after parking the trailer, would transfer the hose coupling from the brake system to fitting 18. On the other hand, if a second and separate hose from the air tank is preferred, this can remain coupled to fitting 18 if an "on-off" valve is included in this portion of the total air system. With the hose from the air tank coupled to fitting 18 the operator moves valve 17 to the "down" position and by depressing the brake pedal in the tractor, air from the tank moves through fitting 18, valve 17 and line 15 to fluid-actuated motors in housings 14 and is exhausted to atmosphere. The motors will independently drive the telescoping lower portions 12 until each leg has been extended to a position at which each bears equal shares of the trailer weight. A very low pressure on the air pressure gauge on the tractor instrument panel will be registered with the pressure building up as the leg makes contact with the ground.

Raising of the legs is accomplished in the same manner with valve 17 moved to the "up" position. Air from the air brake compressor and tank system moves through fitting 18, valve 17 and line 16 to the second impeller in each of the motors. Both raising and lowering of the legs are done with the tractor coupled to the trailer and, in general, while the tractor's engine is running so as to assure an adequate supply of air under pressure.

In FIG. 2 motor housing 14 is connected through bolts 19 to the fixed upper portion 11 of the landing gear leg. By means of square output shaft 21, the fluid-actuated motor within motor housing 14 operates screw 22. Screw 22 when rotating applies force through its threads to ball nut 23 which is kept from turning by locking pin 24. Locking pin 24 is keyed into bearing blocks 25 which with ball nut 23 constitute a ball and socket force-transmitting coupling, the force on this coupling being further transmitted through pins 26 to telescoping lower portion 27 of the leg carrying ground contacting member not shown in FIG. 2 but represented by wheels in FIG. 1.

Telescoping lower portion 27 of the leg, as the moving portion, will be subject to bending forces because of ground irregularities and changing load factors as the semi-trailer is being loaded and unloaded. It will therefore on occasion tend to lean against the fixed upper portion 11 and cause binding between the threads on screw 22 and the threads within ball nut 23. However, by reason of the omni-directional force-transmitting coupling exemplified by the ball and socket assembly, any binding forces are minimized or eliminated. Vertical movement within the ball and socket coupling to compensate for leaning of the telescoping lower portion can be achieved by enlarging in its vertical dimension the slot into which locking pin 24 enters. Similarly, any torque due to such twisting as is incidental to bending forces can be accommodated by enlarging the slot in its horizontal dimension.

Screw 22 toward its upper end has a peripheral enlargement 28 contained within tapered roller bearings 29 held in place by floating rings 30. As an omni-directional bearing arrangement, tapered roller bearings 29 will compensate for any bending forces at the upper end of screw 22. If, for example, the landing gear leg should become bent, the peripheral enlargement 28 will tend to rise on one side and dip on the opposite. In turn, the tapered roller bearings 29 above the peripheral enlargement 28 will move in one direction while the tapered roller bearings 29 beneath the enlargement 28 will move in the opposite direction. The bearings above taken together and those below the enlargement each move as a group because of the floating rings 30 which surround each set as a group. In this manner any binding at this point of the screw is reduced or removed.

FIG. 3 shows screw 22 passing through ball nut 23 which transmits force to telescoping lower portion 27 of the leg via bearing blocks 25, the lower bearing block being in partial cut-a-way to show ball nut 23 and locking pin 24.

FIG. 4, as has been stated, is a top view with partial cut-a-way to show pins 26 connecting bearing blocks 25 to telescoping lower portion 27 of the leg.

Modifications within the scope of the invention may occur to those skilled in the art. Both the ball and socket coupling in the telescoping lower leg and the peripheral enlargement with matching tapered roller bearings at the upper end of the screw are interchangeable. They are not, however, fully equivalent because the arrangement as shown in FIG. 2 gives a better bearing function at the end of the screw at the point where it is connected to the fluid-actuated motor. The somewhat greater swivel effect of a ball and socket coupling at the point where screw joins the motor would probably permit unnecessary and undesirable wobble in the screw. On the other hand, the wobble effect of a ball and socket coupling in the telescoping lower portion of the landing gear leg probably better permits the screw to adjust to load changes and surface irregularities which would tend to bind the screw as stated above.

Although a square output shaft on the fluid-actuated motor is shown within a corresponding hole in the upper end of the screw as the connecting means, a keyed circular shaft is obviously equivalent, for example.

Having thus described the invention what is claimed is:
1. A landing gear for the forward end of a semi-trailer comprising
 (1) two legs each having a fixed upper portion and a telescoping lower portion,
 (2) a torque-producing fluid-actuated motor for each of said legs,
 (3) a screw in each of said legs having toward the upper end of its length a peripheral enlargement, said screw connected at its upper end to said motor,
 (4) an omni-directional bearing for said peripheral enlargement, and
 (5) an omni-directional force-transmitting coupling between said screen and said telescoping lower portion.
2. A landing gear for the forward end of a semi-trailer comprising
 (1) two legs each having a fixed upper portion and a telescoping lower portion,
 (2) a torque-producing fluid-actuated motor for each of said legs,
 (3) a screw in each of said legs having toward the upper end of its length a peripheral enlargement, said screw connected at its upper end to said motor,
 (4) an omni-directional bearing in said upper portion for said peripheral enlargement,
 (5) a ball nut through which said screw passes,
 (6) a socket coupling said ball to nut to said telescoping lower portion of each leg,
3. A landing gear for the forward end of a semi-trailer comprising
 (1) two legs each having a fixed upper portion and a telescoping lower portion,
 (2) a torque-producing fluid-actuated motor for each of said legs,
 (3) a screw in each of said legs having toward the upper end of its length a peripheral enlargement, said screw connected at its upper end to said motor,
 (4) an omni-directional bearing in said upper portion for said peripheral enlargement,
 (5) a ball nut through which said screw passes,
 (6) a socket coupling said ball to said telescoping lower portion, and
 (7) a ground-contacting member attached to the lower end of said telescoping lower portion of each of said legs.
4. A landing gear for the forward end of a semi-trailer according to claim 3 in which said fluid-actuated motor is actuated by air under pressure.

(References on following page)

References Cited by the Examiner

UNITED STATES PATENTS

| | | | |
|---|---|---|---|
| 2,381,529 | 8/1945 | Willis | 254—86 |
| 2,663,542 | 12/1953 | Lincoln et al. | 74—424.8 X |
| 2,875,980 | 3/1959 | Grace | 254—93 |
| 2,945,691 | 7/1960 | Swift et al. | 74—424.8 X |
| 2,959,395 | 11/1960 | Strack et al. | 254—86 |
| 3,002,400 | 10/1961 | Scott | 74—424.8 X |

FOREIGN PATENTS 931,380  10/1947  France.

WILLIAM FELDMAN, *Primary Examiner.*

MILTON S. MEHR, *Examiner.*

O. M. SIMPSON, *Assistant Examiner.*